(12) United States Patent  
Nishida (10) Patent No.: US 8,310,712 B2  
(45) Date of Patent: Nov. 13, 2012

(54) IMAGE FORMING CONTROLLING APPARATUS, IMAGE FORMING CONTROLLING METHOD, AND IMAGE FORMING CONTROLLING PROGRAM EMBODIED ON COMPUTER READABLE RECORDING MEDIUM

(75) Inventor: Masanori Nishida, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 349 days.

(21) Appl. No.: 12/631,357

(22) Filed: Dec. 4, 2009

(65) Prior Publication Data

US 2010/0149595 A1    Jun. 17, 2010

(30) Foreign Application Priority Data

Dec. 12, 2008 (JP) ................... 2008-317625

(51) Int. Cl.
*G06K 15/00* (2006.01)
*G06F 3/12* (2006.01)

(52) U.S. Cl. .................... 358/1.16; 358/1.15

(58) Field of Classification Search ................ 358/1.15, 358/1.14, 1.11, 1.13, 1.16; 399/82; 705/40; 719/321
See application file for complete search history.

(56) References Cited

U.S. PATENT DOCUMENTS

| | | | | |
|---|---|---|---|---|
| 7,916,334 B2 * | 3/2011 | Kurotsu | .................. | 358/1.15 |
| 2003/0140008 A1 * | 7/2003 | Kawamoto | .................. | 705/40 |
| 2006/0279783 A1 * | 12/2006 | Kato | .................. | 358/1.18 |
| 2008/0151293 A1 * | 6/2008 | Narukawa | .................. | 358/1.15 |
| 2009/0086253 A1 * | 4/2009 | Okubo | .................. | 358/1.14 |
| 2009/0201540 A1 * | 8/2009 | Morooka | .................. | 358/1.15 |
| 2009/0252524 A1 * | 10/2009 | Morooka | .................. | 399/82 |
| 2009/0257088 A1 * | 10/2009 | Tokashiki | .................. | 358/1.15 |
| 2010/0058360 A1 * | 3/2010 | Asai | .................. | 719/321 |
| 2011/0096354 A1 * | 4/2011 | Liu | .................. | 358/1.15 |

FOREIGN PATENT DOCUMENTS

JP    7-134707    5/1995

(Continued)

OTHER PUBLICATIONS

Japanese Notice of Ground of Rejection mailed Feb. 22, 2011, directed to counterpart Japanese Application No. 2008-317625; 6 pages.

(Continued)

*Primary Examiner* — Jerome Grant, II
(74) *Attorney, Agent, or Firm* — Morrison & Foerster LLP (57) ABSTRACT

To facilitate per-page setting for data to be printed in an MFP, a PC controlling the MFP includes a print instruction accepting portion to accept data including pages and page setting information having, for each page, a parameter set for a page setting item which can be set per page, an HDD which stores in advance setting information in which a first parameter which can be set for the page setting item is associated with a second parameter which can be set for a subordinate item selected from option items which can be set for printing in the MFP, and a command generating portion to generate, for each page, a command to cause the MFP to perform printing, based on the first parameter set for the page setting item in the accepted page setting information and the second parameter associated with that first parameter by the stored setting information.

9 Claims, 9 Drawing Sheets

FOREIGN PATENT DOCUMENTS

| | | |
|---|---|---|
| JP | 11-110372 | 4/1999 |
| JP | 2003-323272 A | 11/2003 |
| JP | 2005-250606 A | 9/2005 |
| JP | 2005-318105 A | 11/2005 |
| JP | 2007-213365 A | 8/2007 |
| JP | 2008-234299 | 10/2008 |

OTHER PUBLICATIONS

Japanese Notice of Ground of Rejection mailed Oct. 26, 2010, directed to corresponding Japanese Patent Application No. 2008-317625; 5 pages.

* cited by examiner

| SETTING ITEM | PARAMETER |
|---|---|
| PAPER SIZE | A4 |
| PAPER TRAY | TRAY 02 |
| ⋮ | ⋮ |

SETTINGS PER PAPER TRAY - EDIT LIST  301

PAPER TRAY: TRAY 01

LIST OF SETTINGS — 309
LIST NAME: LIST 1                                    EDIT LIST NAME

| PAPER TRAY | PRINT STYLE | INDEX PAPER | STAPLING | PUNCHING | END OF STAPLING |
|---|---|---|---|---|---|
| BODY TEXT | SINGLE SIDE | AUTO | | | |
| TRAY 01 | SINGLE-SIDE PRINTING | DO NOT USE | LEFT CORNER | ON | OFF |
| TRAY 02 | INSERT BLANK SHEET | USE | TWO (LEFT) | ON | OFF |
| TRAY 03 | SINGLE-SIDE PRINTING | DO NOT USE | TWO (LEFT) | OFF | OFF |
| TRAY 04 | DOUBLE-SIDE PRINTING | DO NOT USE | THE SAME AS IN BODY TEXT | THE SAME AS IN BODY TEXT | OFF |

▲ UP    ▼ DOWN    ADD    DELETE    DELETE ALL

SET INDEX PAPER    SET PUNCHING — 311    SET STAPLING
SET NUMBER OF PAPER TRAYS
CHANGE SETTINGS — 313
SINGLE-SIDE PRINTING — 307

ADD & EDIT
PAPER TRAY
TRAY 01 — 303
SETTING ITEMS — 305
PRINT STYLE      SINGLE-SIDE PRINTING
INDEX PAPER      DO NOT USE
STAPLING         LEFT CORNER
END OF STAPLING  OFF
PUNCHING         ON
NAME TO BE DISPLAYED  TRAY 01

OK    CANCEL    HELP

FIG. 8

SETTING INFORMATION

| PAGE SETTING ITEM | SUBORDINATE ITEM A | SUBORDINATE ITEM B | SUBORDINATE ITEM C | SUBORDINATE ITEM D | SUBORDINATE ITEM E |

IMAGE FORMING CONTROLLING APPARATUS, IMAGE FORMING CONTROLLING METHOD, AND IMAGE FORMING CONTROLLING PROGRAM EMBODIED ON COMPUTER READABLE RECORDING MEDIUM

This application is based on Japanese Patent Application No. 2008-317625 filed with Japan Patent Office on Dec. 12, 2008, the entire content of which is hereby incorporated by reference.

BACKGROUND OF THE INVENTION

1. Field of the Invention

The present invention relates to an image forming controlling apparatus, an image forming controlling method, and an image forming controlling program embodied on a computer readable recording medium. More particularly, the present invention relates to an image forming controlling apparatus for controlling an image forming apparatus, and an image forming controlling method and an image forming controlling program embodied on a computer readable recording medium for implementing the image forming controlling apparatus.

2. Description of the Related Art

Conventionally, in printing document data having a plurality of pages using an image forming apparatus such as a printer, it is necessary to set, on a document basis, printing conditions such as paper size, the number of copies, single-side or double-side printing, color or monochrome printing, n-up printing for printing an n number of pages on one side of a sheet of paper, and others. Japanese Patent Laid-Open No. 07-134707 discloses a printing processing apparatus which enables setting of printing conditions in units of pages.

Items for setting printing conditions that can be set in an application program used to generate document data, however, are restricted. Thus, printing conditions that can be set in units of pages are set only when a printer driver program installed in a computer for controlling a printer is executed by the computer. Specifically, a portion in the computer responsible for executing the printer driver program sets printing conditions in association with page numbers which are assigned to the respective pages of document data received from a portion in the computer responsible for executing the application program. The printing conditions are not directly set for the respective pages of the document data. This means that, when a page is added to or deleted from the document data, the printing conditions which have been set for the document data before the addition or deletion of the page cannot be used as they are, and it is thus necessary to set printing conditions again after modification of the document data.

SUMMARY OF THE INVENTION

The present invention has been accomplished in view of the foregoing problem, and an object of the present invention is to provide an image forming controlling apparatus which can facilitate setting on a page basis necessary for an image forming apparatus to execute printing.

Another object of the present invention is to provide an image forming controlling method which can facilitate setting on a page basis necessary for an image forming apparatus to execute printing.

A further object of the present invention is to provide an image forming controlling program embodied on a computer readable recording medium which can facilitate setting on a page basis necessary for an image forming apparatus to execute printing.

To achieve the above-described objects, according to an aspect of the present invention, an image forming controlling apparatus is for controlling an image forming apparatus, the image forming controlling apparatus including: a print instruction accepting portion to accept data and page setting information, the data including a plurality of pages, the page setting information including a page setting item which can be set on a page basis and having a parameter set for the page setting item for each of the plurality of pages; a setting information storing portion to store setting information in advance, the setting information associating a first parameter which can be set for the page setting item with at least one second parameter which can be set respectively for at least one subordinate item selected from among a plurality of option items which can be set for printing in the image forming apparatus; and a command generating portion to generate, for each of the plurality of pages, a command to cause the image forming apparatus to perform printing, on the basis of the first parameter set for the page setting item in the accepted page setting information and the at least one second parameter associated with the first parameter by the stored setting information.

According to another aspect of the present invention, an image forming controlling method is for controlling an image forming apparatus, the image forming controlling method including the steps of: accepting data and page setting information, the data including a plurality of pages, the page setting information including a page setting item which can be set on a page basis and having a parameter set for the page setting item for each of the plurality of pages; storing setting information in advance, the setting information associating a first parameter which can be set for the page setting item with at least one second parameter which can be set respectively for at least one subordinate item selected from among a plurality of option items which can be set for printing in the image forming apparatus; and generating, for each of the plurality of pages, a command to cause the image forming apparatus to perform printing, on the basis of the first parameter set for the page setting item in the accepted page setting information and the at least one second parameter associated with the first parameter by the stored setting information.

According to a further aspect of the present invention, an image forming controlling program embodied on a computer readable recording medium is executed by a computer controlling an image forming apparatus, the image forming controlling program causing the computer to perform the steps of: accepting data and page setting information, the data including a plurality of pages, the page setting information including a page setting item which can be set on a page basis and having a parameter set for the page setting item for each of the plurality of pages; storing setting information in advance, the setting information associating a first parameter which can be set for the page setting item with at least one second parameter which can be set respectively for at least one subordinate item selected from among a plurality of option items which can be set for printing in the image forming apparatus; and generating, for each of the plurality of pages, a command to cause the image forming apparatus to perform printing, on the basis of the first parameter set for the page setting item in the accepted page setting information and the at least one second parameter associated with the first parameter by the stored setting information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described with reference to the drawings. In the following description, like reference characters denote like parts, which have like names and functions, and therefore, detailed description thereof will not be repeated.

Figure 1:
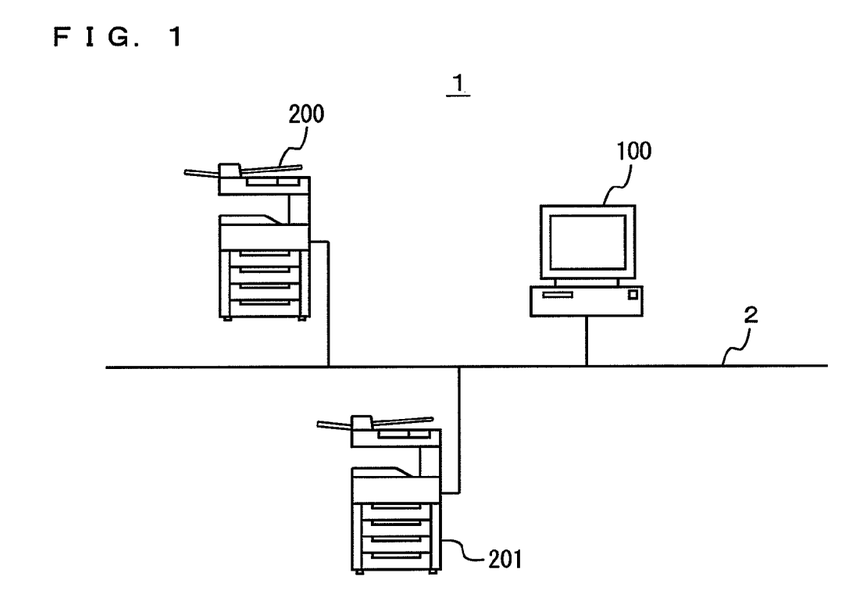
FIG. 1 schematically shows a printing system according to an embodiment of the present invention.

FIG. 1 schematically shows a printing system according to an embodiment of the present invention. Referring to FIG. 1, a printing system 1 includes a personal computer (hereinafter, referred to as "PC") 100 and multi function peripherals (MFPs) 200 and 201, which are each connected to a network 2.

MFPs 200 and 201 each include a scanner device for reading an original, and an image forming device and a facsimile device for forming an image on a recording medium such as a sheet of paper based on image data, and have the image reading function, copying function, and facsimile transmitting/receiving function. While MFPs 200 and 201 are described as examples of the image forming apparatus in the present embodiment, the image forming apparatus is not limited to MFPs 200 and 201, and may be a scanner, a facsimile machine, a personal computer generating image data, or another apparatus, as long as it is provided with the function of processing images. MFPs 200 and 201 are identical in terms of hardware configuration and function, and therefore, MFP 200 will be described representatively, unless otherwise stated.

PC 100 is a typical computer. PC 100 has a printer driver program installed therein, which is an image forming controlling program for controlling MFPs 200 and 201. When a user causes PC 100 to execute an application program and inputs to PC 100 a print instruction for printing data that is processed by the application program, PC 100 executes the printer driver program. PC 100 which executes the driver program converts the data processed by the application program into print data which will be printed, generates control data including a command to execute printing in accordance with the print instruction, and transmits the print data and the control data to MFP 200 or 201. As a result, MFP 200 or 201 executes the printing process.

Network 2 is a local area network (LAN), which may be connected in a wired or wireless manner. Network 2 is not necessarily the LAN; it may be a network using a wide area network (WAN) such as the Internet, public switched telephone networks (PSTN), and the like.

Figure 2:
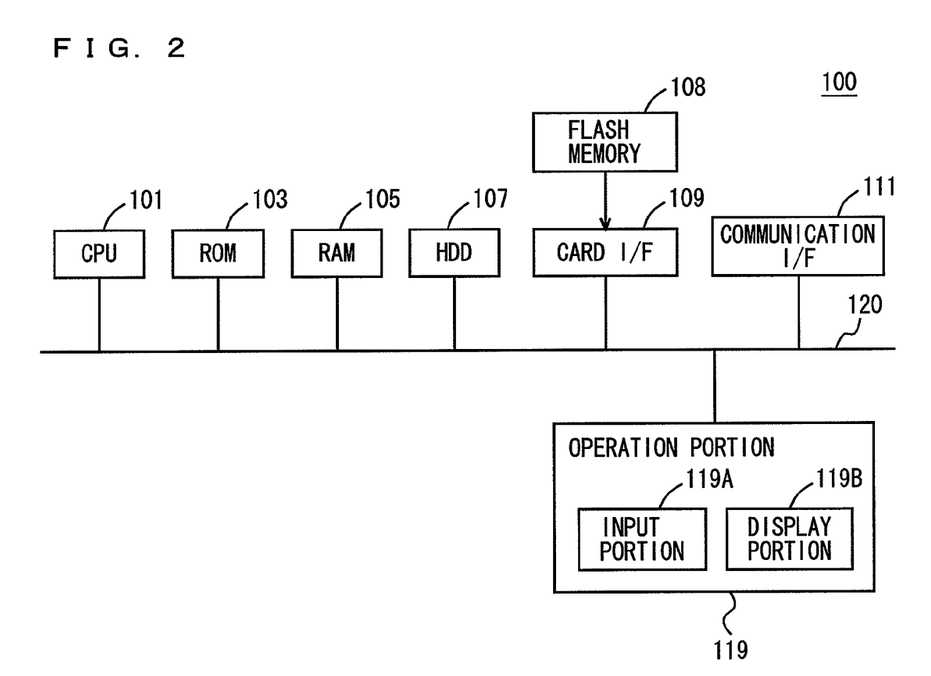
FIG. 2 is a block diagram showing an example of the hardware configuration of a PC according to the embodiment.

FIG. 2 is a block diagram showing an example of the hardware configuration of PC 100 according to the present embodiment. Referring to FIG. 2, PC 100 includes: a central processing unit (CPU) 101, a read only memory (ROM) 103 which stores therein a program executed by CPU 101 and others, a random access memory (RAM) 105 for loading a program to be executed and for storing data which is being processed by the program, a hard disk drive (HDD) 107 which stores data in a nonvolatility manner, a card interface (I/F) 109 mounted with a flash memory 108, a communication interface (I/F) 111 through which PC 100 is connected to network 2, an operation portion 119 which functions as an interface with a user, and a bus 120 to which the above elements are connected.

CPU 101 loads a printer driver program, which is recorded on flash memory 108 mounted to card I/F 109, into RAM 105 for execution. It is noted that the printer driver program executed by CPU 101 is not restricted to the printer driver program recorded on flash memory 108. CPU 101 may load the printer driver program stored in HDD 107 into RAM 105 for execution. In this case, another computer connected to network 2 may rewrite the printer driver program stored in HDD 107 of PC 100, or may additionally write a new printer driver program therein. Further, PC 100 may download a printer driver program from another computer connected to network 2, and store the printer driver program in HDD 107. As used herein, the "printer driver program" includes, not only the program which CPU 101 can execute directly, but also a source program, a compressed program, an encrypted program, and others.

Operation portion 109 includes an input portion 119A and a display portion 109B. Input portion 119A is an input device such as a keyboard or a mouse which accepts an input of an operation by a user of PC 100. Display portion 119B is a display such as a liquid crystal display (LCD) or an organic electro-luminescence display (organic ELD) panel, or a cathode-ray tube (CRT). Input portion 119A may include a pointing device such as a touch panel.

Communication I/F 111 is a communication interface for connecting PC 100 to network 2. This allows communication between PC 100 and MFPs 200 and 201. While PC 100 and MFPs 200 and 201 are connected via network 2, they may be connected directly using a serial interface or a parallel interface. As communication I/F 111, an interface conforming to the connection manner between PC 100 and MFPs 200 and 201 is used.

Figure 3:
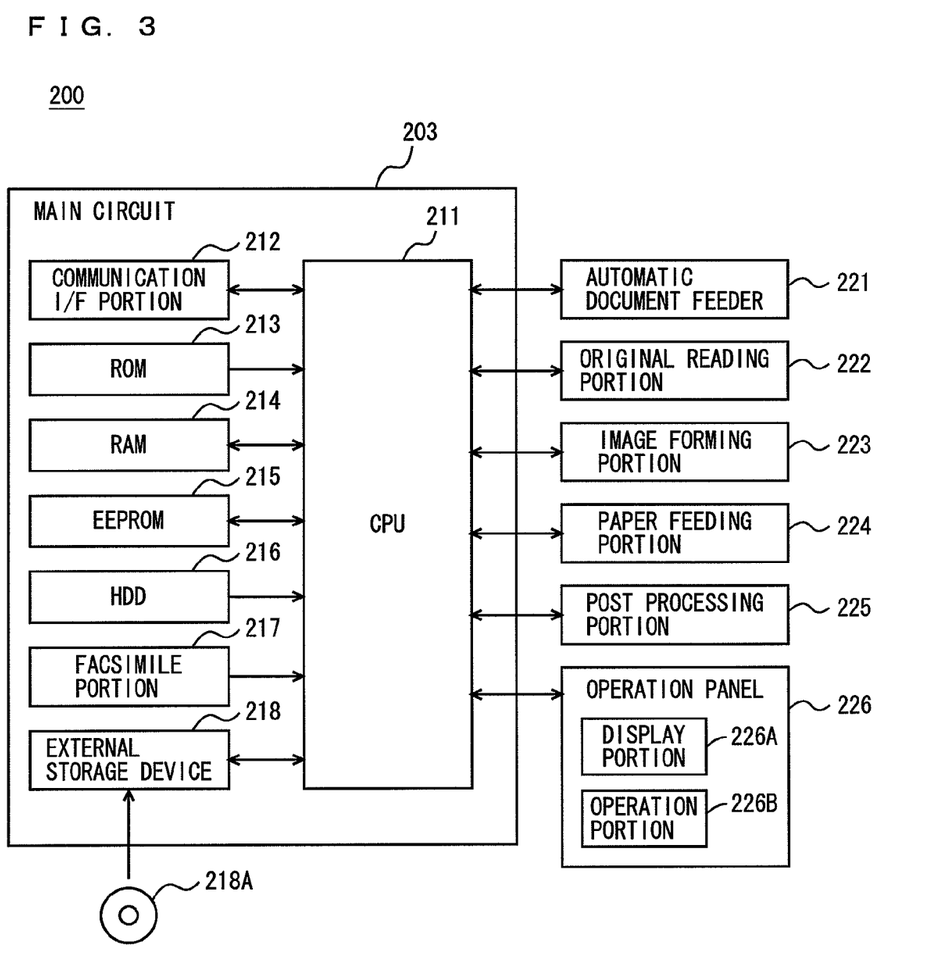
FIG. 3 is a block diagram showing an example of the hardware configuration of an MFP.

FIG. 3 is a block diagram showing an example of the hardware configuration of the MFP. Referring to FIG. 3, MFP 200 includes: a main circuit 203; an original reading portion 222 which reads an original; an automatic document feeder (ADF) 221 which carries an original into original reading portion 222; an image forming portion 223 which forms an image on a recording medium such as a sheet of paper based on image data which is output from original reading portion 222 after being read from an original by original reading portion 222; a paper feeding portion 224 which supplies sheets of paper to image forming portion 223; a post processing portion 225 which discharges sheets of paper having images formed thereon; and an operation panel 226 serving as a user interface.

ADF 221 automatically carries a plurality of originals set in a document feed tray one by one to original reading portion 222. Original reading portion 222 optically reads image information such as a photograph, character, picture, and the like from an original for obtaining image data. When receiving the image data, image forming portion 223 forms an image on a sheet of paper based on the image data. Image forming portion 223 forms the image using four colors of toners of yellow, magenta, cyan, and black.

Paper feeding portion 224 has four paper trays, each of which stores different types of paper. That is, paper feeding portion 224 can store four types of paper. The type of paper is classified according to size and paper orientation as well as material, color, and shape of paper. It is here assumed that the four paper trays are named "tray 01", "tray 02", "tray 03", and "tray 04", and store sheets of paper which are identical in terms of paper size, which is A4 size, but different in terms of type or orientation. Paper feeding portion 224 carries the sheets of paper stored in a tray that is designated by an instruction received from a central processing unit (CPU) 211 included in main circuit 201, one by one to image forming portion 223. While MFP 200 having four trays is described here, the number of paper trays is not limited to four; it may be one or more than one.

Post processing portion 225 discharges the sheets of paper having images formed thereon. Post processing portion 225 has a plurality of discharge trays to allow the sheets to be sorted and discharged. Further, post printing portion 225 has a hole-punching portion and a stapling portion to enable punching or stapling of the discharged sheets.

Operation panel 226, which is provided on an upper surface of MFP 200 as a user interface, includes a display portion 226A and an operation portion 226B. Display portion 226A is a display such as a liquid crystal display (LCD) or an organic electro-luminescence display (organic ELD), and displays an instruction menu for the user, information about acquired image data, and others. Operation portion 226B, which is provided with a plurality of keys, accepts an input of data such as instructions, characters, and numerical characters, according to the key operations by the user. Operation portion 226B further includes a touch panel provided on display portion 226A.

Main circuit 201 includes a central processing unit (CPU) 211, a communication interface (I/F) portion 212, a read only memory (ROM) 213, a random access memory (RAM) 214, an electrically erasable and programmable ROM (EEPROM) 215, a hard disk drive (HDD) 216 as a mass storage, a facsimile portion 217, and an external storage device 218 mounted with a compact disc-ROM (CD-ROM) 218A. CPU 211 is connected with ADF 221, original reading portion 222, image forming portion 223, paper feeding portion 224, post processing portion 225, and operation panel 226, and is responsible for overall control of MFP 200.

ROM 213 stores a program executed by CPU 211 or data necessary for execution of the program. RAM 214 is used as a work area when CPU 211 executes a program. Further, RAM 214 temporarily stores read data (image data) continuously transmitted from original reading portion 222.

Communication I/F portion 212 is an interface for connecting MFP 200 to a network. CPU 211 communicates with PC 100 via communication I/F portion 212, for transmission/reception of data.

Facsimile portion 217 is connected to public switched telephone networks (PSTN), and transmits facsimile data to or receives facsimile data from the PSTN. Facsimile portion 217 stores the received facsimile data in HDD 216, or outputs it to image forming portion 223. Image forming portion 223 prints the facsimile data received by facsimile portion 217 on a sheet of paper. Further, facsimile portion 217 converts the data stored in HDD 216 to facsimile data, and transmits it to a facsimile machine connected to the PSTN.

External storage device 218 is mounted with CD-ROM 218A. CPU 211 is capable of accessing CD-ROM 218A via external storage device 218. While it is here assumed that CPU 211 executes a program stored in ROM 213, CPU 211 may load the program stored in CD-ROM 218A into RAM 214 for execution.

When receiving a print job including print data and printing conditions from PC 100, MFP 200 forms an image of the print data in accordance with the printing conditions. The printing conditions include commands in which parameters are set for a plurality of setting items, respectively.

Figure 4:
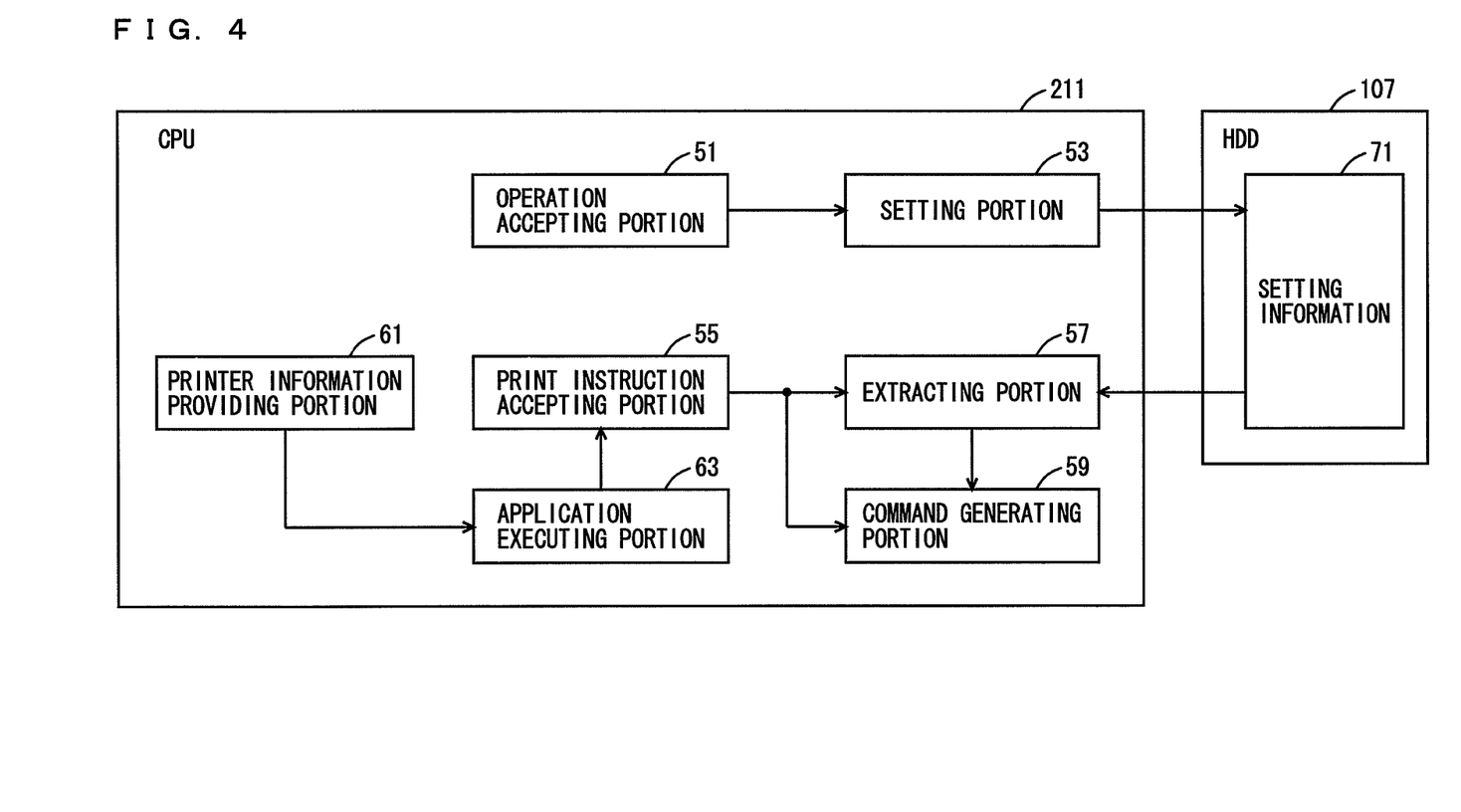
FIG. 4 is a functional block diagram schematically showing the functions of a CPU included in the PC, together with information stored in an HDD.

FIG. 4 is a functional block diagram schematically showing the functions of the CPU included in the PC, together with information stored in the HDD. Referring to FIG. 4, CPU 101 included in PC 100 includes: an operation accepting portion 51 which accepts an operation performed by a user; a setting portion 53 which adds, modifies, and deletes setting information; an application executing portion 63 which executes an application program; a printer information providing portion 61 which provides application executing portion 63 with printer information; a print instruction accepting portion 55 which receives print data from application executing portion 63; an extracting portion 57 which extracts predetermined setting information from among setting information 71 stored in HDD 107; and a command generating portion 59 which generates a command to be included in control data.

Operation accepting portion 51, setting portion 53, printer information providing portion 61, print instruction accepting portion 55, extracting portion 57, and command generating portion 59 are formed in CPU 101 as CPU 101 executes a printer driver program (image forming controlling program). Application executing portion 63 is formed in CPU 101 as CPU 101 executes an application program. The application program is a program for managing data including a plurality of pages on a page basis. The data may be, e.g., portable document format (PDF) data.

Printer information providing portion 61 communicates with MFP 200 in advance, to acquire from MFP 200 a plurality of setting items which can be given to MFP 200 as printing conditions, and at least one parameter which can be set for each of the setting items. The setting items include a setting item "paper tray" for designating one of four paper trays included in paper feeding portion 224 in MFP 200. Printer information providing portion 61 acquires the setting item "paper tray", and names of the paper trays "tray 01", "tray 02", "tray 03", and "tray 04" for identifying the respective paper trays as the parameters which can be set for the setting item "paper tray".

Printer information providing portion 61 outputs to application executing portion 63 a page setting item included in the plurality of setting items, and at least one parameter which can be set for the page setting item. The page setting item refers to a setting item, among the plurality of setting items included in the printing conditions, which can be set for each of a plurality of pages included in the data to be printed. The page setting item may be predetermined by printer information providing portion 61, or may be selected in response to a request from application executing portion 63. Here, it is assumed that the setting item "paper tray" for designating one of the four paper trays included in paper feeding portion 224 in MFP 200 is predetermined as the page setting item.

Further, in the present embodiment, the first parameters which can be set for the page setting item are each named so as to identify one of the four paper trays included in paper feeding portion 224 in MFP 200, and there may be one or more first parameters corresponding to a respective one of the four paper trays. For example, the first parameters "tray 11", "tray 21", and "tray 31" may be set corresponding to the paper tray named "tray 01", wherein in each two-digit number, the number in the one's place specifies the paper tray named "tray 01", and the number in the ten's place is unique to that parameter. The parameters "tray 11", "tray 21", and "tray 31" are determined in setting information 71 set by setting portion 53, which will be described later.

Printer information providing portion 61 outputs printer information to application executing portion 63. The printer information includes the page setting item "paper tray", and a set of paper tray designation "tray 01" as the parameter which can be set for the page setting item and paper size "A4" of the paper stored in that tray, a set of paper tray designation "tray 02" and paper size "A4" of the paper stored in that tray, a set of paper tray designation "tray 03" and paper size "A4" of the paper stored in that tray, a set of paper tray designation "tray 04" and paper size "A4" of the paper stored in that tray, a set of paper tray designation "tray 11" and paper size "A4" of the paper stored in that tray, a set of paper tray designation "tray 21" and paper size "A4" of the paper stored in that tray, and a set of paper tray designation "tray 31" and paper size "A4" of the paper stored in that tray. Here, the paper tray designations are the first parameters.

Application executing portion 63 displays in display portion 119B the data to be processed. The data to be processed includes a plurality of pages. When a user inputs a page setting instruction into input portion 119A while a certain page of the data is being displayed on display portion 119B, application executing portion 63 displays a page setting screen on display portion 119B. When the user inputs page setting information into input portion 119A, application executing portion 63 accepts the input page setting information as the page setting information for the one of the pages included in the data that has been displayed on display portion 119B. The page setting information is part of the printing conditions which are set for the data to be processed, for each of the plurality of pages included in the data. When the user inputs a print instruction into input portion 119A, application executing portion 63 accepts the print instruction, and outputs the data to be processed and the page setting information set for each page to print instruction accepting portion 55.

The page setting information indicates that one first parameter selected from at least one first parameter is set with respect to the page setting item included in the printer information input from printer information providing portion 61. The page setting information includes at least the page setting item and the first parameter. For example, in the case where "tray 01" is set from among the first parameters "tray 01", "tray 02", "tray 03", "tray 04", "tray 11", "tray 21", and "tray 31" which can be set for the page setting item "paper tray", application executing portion 63 outputs the page setting information including "paper tray" as the page setting item and "tray 01" as the first parameter to print instruction accepting portion 55.

Figure 5:
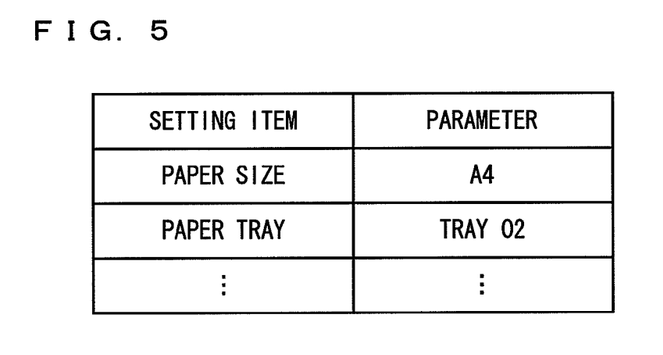
FIG. 5 shows page setting information by way of example.

FIG. 5 shows an example of the page setting information. Referring to FIG. 5, the page setting information includes a parameter "A4" with respect to the setting item "paper size", and also includes a paper tray designation "tray 02" as the first parameter with respect to the setting item "paper tray" which is the page setting item.

Figure 6:
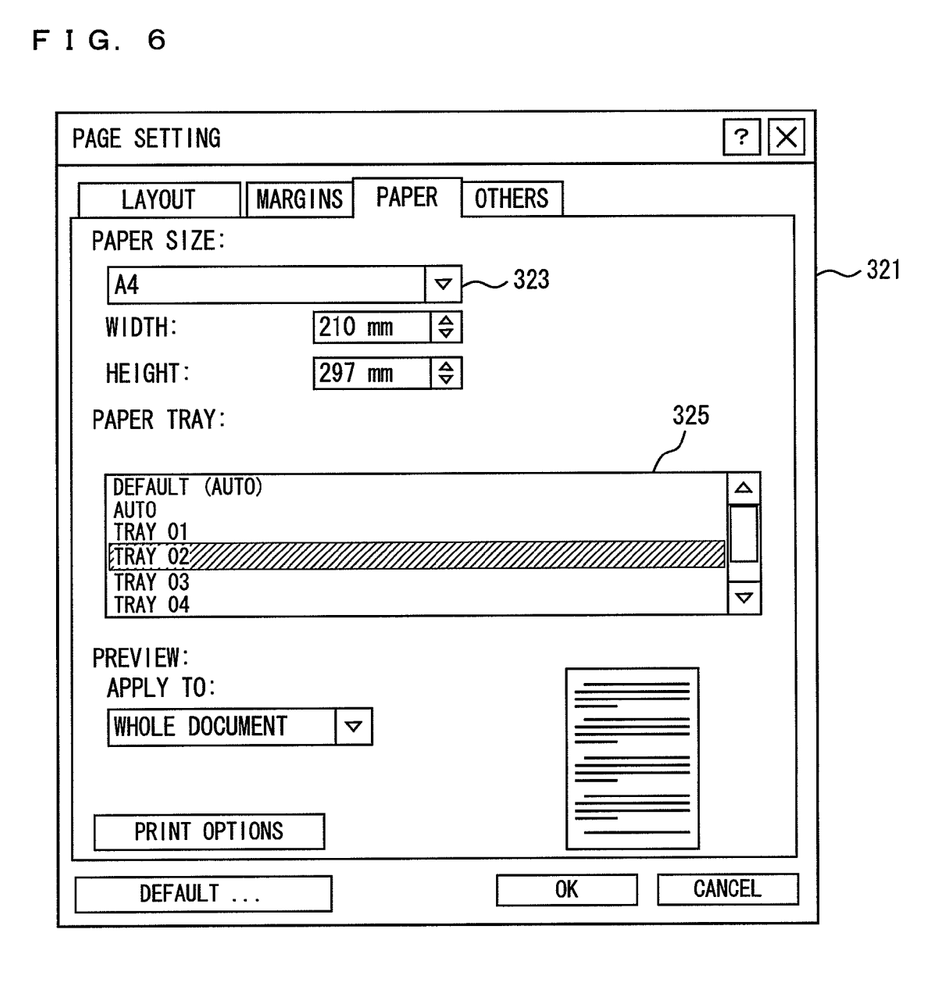
FIG. 6 shows a page setting screen by way of example.

FIG. 6 shows a page setting screen by way of example. Referring to FIG. 6, a page setting screen 321 includes an area 323 in which a page size is set, and an area 325 in which a paper tray is set. When the user sets a paper size in area 323, paper tray designations for identifying the paper trays which store the paper of the set paper size, "default", and "auto" are displayed in area 325 in a selectable manner. The paper tray designations displayed in a selectable manner in area 325 for setting the paper tray correspond to the first parameters included in the printer information which is input from printer information providing portion 61 to application executing portion 63. The option "default" is for designating a predetermined paper tray, which is here "tray 01". The option "auto" is for automatically setting the paper tray corresponding to the set paper size. When the user designates one of the options displayed in area 325 via input portion 119A, the paper tray designation that is determined by the designated option is set in the page setting information.

Returning to FIG. 4, when the page setting information is set for the data, application executing portion 63 stores in HDD 107 the page setting information in association with the data. In the case where a page is inserted into or deleted from the data for which the page setting information has been set, application executing portion 63 updates the page setting information in such a manner that the page setting information which has been set for the respective pages in the data before insertion or deletion of a page is maintained even after the insertion or deletion of the page. This ensures that, even when a page is inserted into or deleted from the data for which the page setting information has been set, the page setting information set for the respective pages remains unchanged before and after the insertion or deletion of the page.

Operation accepting portion 51 displays on display portion 119B a setting information setting screen which is for use in adding, modifying, and deleting the setting information. Operation accepting portion 51 accepts a user operation which the user inputs into input portion 119A in accordance with the setting information setting screen. Operation accepting portion 51 outputs the accepted operation to setting portion 53.

In the case where the operation input from operation accepting portion 51 is one for adding setting information, setting portion 53 generates new setting information and stores it in HDD 107. In this manner, setting information 71 is newly stored in HDD 107. In the case where the operation accepted by operation accepting portion 51 is for modifying or deleting setting information 71, setting portion 53 modifies or deletes setting information 71 stored in HDD 107.

Setting information 71 associates the first parameter, which can be set for the page setting item, with at least one second parameter, which can be set respectively for at least one subordinate item selected from among a plurality of option items which can be set to MFP 200 for printing in MFP 200. Here, the page setting item is "paper tray", and correspondingly, the first parameters include "tray 01", "tray 02", "tray 03", "tray 04", "tray 11", "tray 21", and "tray 31" which are each named so as to identify one of the four paper trays included in paper feeding portion 224 in MFP 200. These seven first parameters set for the page setting item are each associated with at least one second parameter, whereby seven pieces of setting information 71 are generated. In other words, setting information 71 of the same number as the number of the first parameters each named to identify one of the four paper trays included in paper feeding portion 224 can be stored.

The subordinate items are items that can be set on a page basis among the option items which can be set as the printing conditions for printing in MFP 200. Here, it is assumed that the subordinate items include "print style", "index paper", "stapling", "punching", and "end of stapling".

The subordinate item "print style" is the option item for setting either of single-side printing or double-side printing, or insertion of a blank sheet of paper without printing. The second parameters which can be set for the subordinate item "print style" include: "single-side printing" for setting such that printing is performed on a single side of paper; "double-side printing" for setting such that printing is performed on both sides of paper; and "insert blank sheet" for setting such that a blank sheet of paper is inserted, with no printing performed thereon.

The subordinate item "index paper" is the option item for setting whether to use index paper. The second parameters which can be set for the subordinate item "index paper" include: "use" for setting such that the index paper is used; and "do not use" for setting such that the index paper is not used.

The subordinate item "stapling" is the option item for setting whether to perform stapling on the paper. The second parameters which can be set for the subordinate item "stapling" are parameters for setting the number of staples to be applied as well as the places to be stapled when stapling is to be performed on the paper. The second parameters include: "left corner" for setting such that the paper is stapled at a left corner of the paper; "right corner" for setting such that the paper is stapled once at a right corner of the paper; "two (left)" for setting such that the paper is stapled at two places on the left side of the paper; "two (top)" for setting such that the paper is stapled at two places on the top side of the paper; and "the same as in body text" for setting such that the paper is stapled at the same position as and at the same number of places as set for the body text.

The subordinate item "punching" is the option item for setting whether to perform punching on the paper to make punch holes. The second parameters which can be set for the subordinate item "punching" include: "on" for setting such that punching is performed on the paper; "off" for setting such that punching is not performed on the paper; and "the same as in body text" for setting the same way as in the body text.

The second parameters which can be set for the subordinate item "end of stapling" are for setting, in the case where the previous page has been set to perform stapling, whether to perform stapling for the pages up to the current page or for the pages including the succeeding page. The second parameters include: "off" for setting such that the stapling is performed together with the succeeding page; and "on" for setting such that the stapling is performed for the pages up to the current page.

Figure 7:
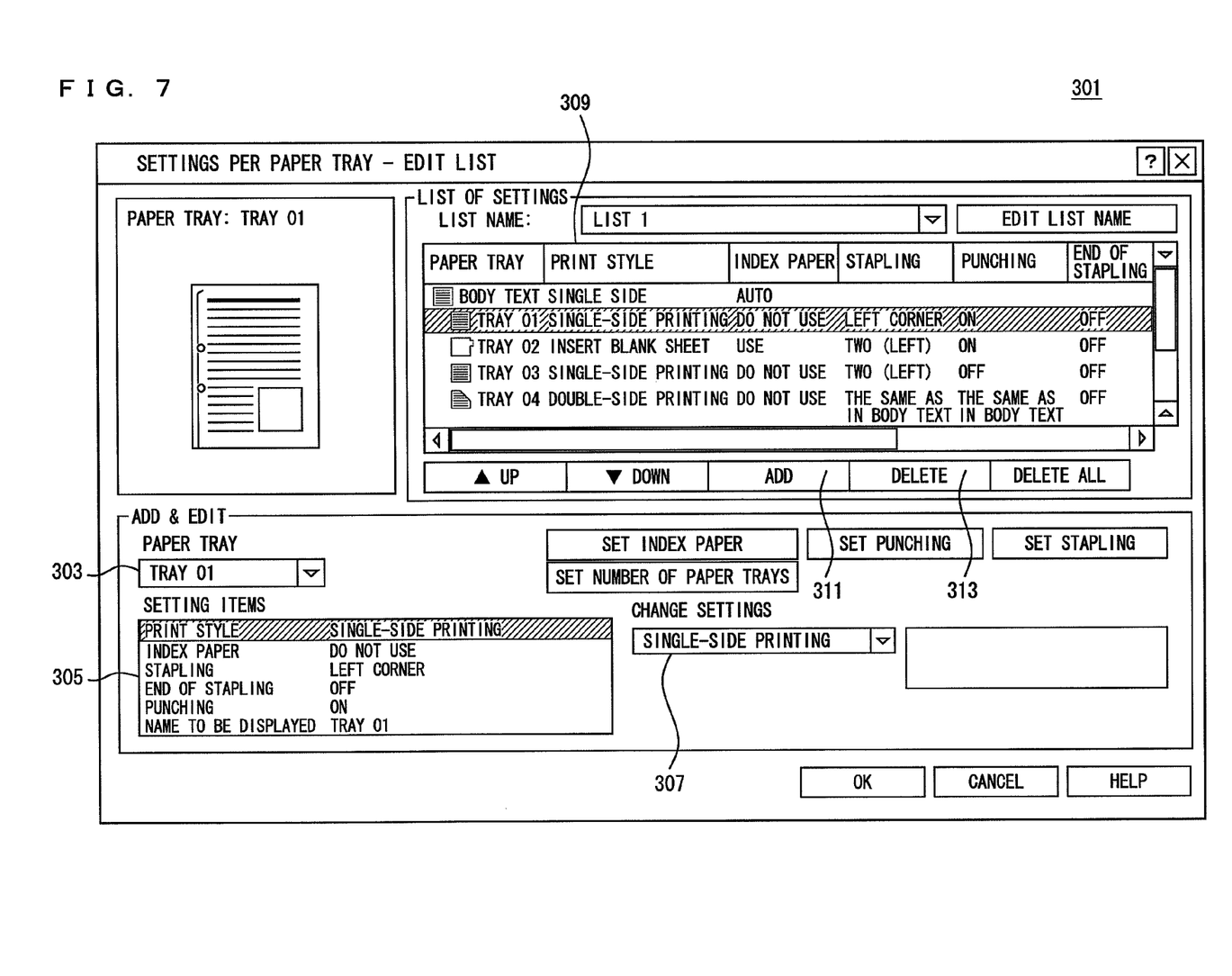
FIG. 7 shows a setting information setting screen by way of example.

FIG. 7 shows a setting information setting screen by way of example. Referring to FIG. 7, a setting information setting screen 301 includes an area 309 in which a list of setting information 71 is displayed, an area 303 in which a first parameter is designated, an area 305 in which second parameters which have been set for the respective subordinate items are displayed, an area 307 in which the second parameters of the subordinate items can be changed, and buttons 311 and 313.

In area 309, the setting information is displayed, which includes one first parameter corresponding to the page setting item "paper tray" and five second parameters corresponding to the subordinate items "print style", "index paper", "stapling", "punching", and "end of stapling", respectively.

When any of the setting information displayed in area 309 is selected, the selected setting information becomes a target to be modified or deleted. FIG. 7 shows the case where the setting information with the paper tray designation "tray 01" has been selected. The first parameter which has been set for the page setting item "paper tray" in the selected setting information is displayed in area 303, and the second parameters which are defined by the selected setting information and associated with the designated first parameter are displayed in area 305, together with the names of the corresponding subordinate items.

When a name of the subordinate item is selected in area 305, the second parameter which has been set corresponding to the selected subordinate item is displayed in area 307. In the example shown in FIG. 7, the subordinate item "print style" has been selected, and "single-side printing" is displayed in area 307 as the second parameter. When the second parameter being displayed in area 307 is changed to another second parameter, an operation of changing the second parameter set for the subordinate item is input, whereby the setting information is modified.

In the case where button 313 having the letters "delete" displayed thereon is designated in the state where the setting information has been selected in area 309, an operation of deleting the setting information is accepted, and accordingly, the setting information is deleted.

Furthermore, when the user designates button 311 having the letters "add" displayed thereon, new setting information is added. Specifically, when the user inputs into area 303 the first parameter that is to be defined in new setting information for the page setting item "paper tray", and when the user also inputs into area 307 five second parameters that are to be defined in the new setting information for the five subordinate items, respectively, an operation of adding new setting information is accepted, and thus, the new setting information is added.

Figure 8:
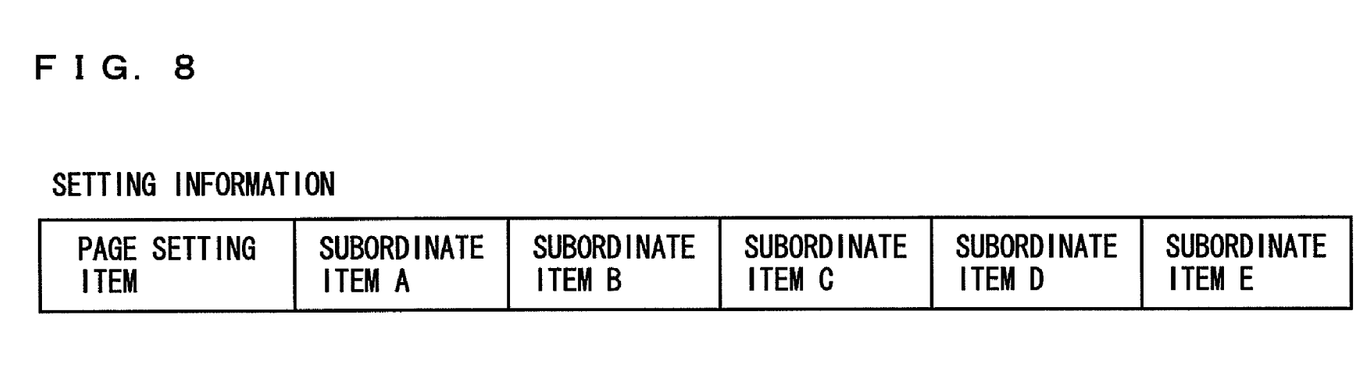
FIG. 8 shows a format of setting information by way of example.

FIG. 8 shows a format of the setting information by way of example. Referring to FIG. 8, the setting information includes a field for the page setting item, and five fields for the subordinate items A to E. The first parameter is set in the field for the page setting item, and the second parameters are set in the respective fields for the five subordinate items A to E. Here, the page setting item is "paper tray", the subordinate item A is "print style", the subordinate item B is "index paper", the subordinate item C is "stapling", the subordinate item D is "punching", and the subordinate item E is "end of stapling".

Returning to FIG. 4, print instruction accepting portion 55 receives the data and the page setting information from application executing portion 63. Print instruction accepting portion 55 outputs the received page setting information to extracting portion 57, and outputs the received data to command generating portion 59.

When receiving the page setting information from print instruction accepting portion 55, extracting portion 57 extracts, from setting information 71 stored in HDD 107, the setting information in which the same first parameter as the one that has been set for the page setting item "paper tray" in the received page setting information is set in the field of the page setting item. Extracting portion 57 then outputs the first parameter and the five second parameters which are set in the respective subordinate items A to E in the extracted setting information to command generating portion 59.

Command generating portion 59 converts the data received from print instruction accepting portion 55 to print data which is to be printed in MFP 200. Further, command generating portion 59 generates a command including the set of the page setting item and the first parameter received from extracting portion 57, and five commands including the respective sets of the subordinate items and the corresponding second parameters. Command generating portion 59 then generates a print job which includes the print data and control data including the generated commands, and transmits the print job to MFP 200. The print job is written, e.g., in page description language (PDL) or in printer job language (PJL).

Figure 9:
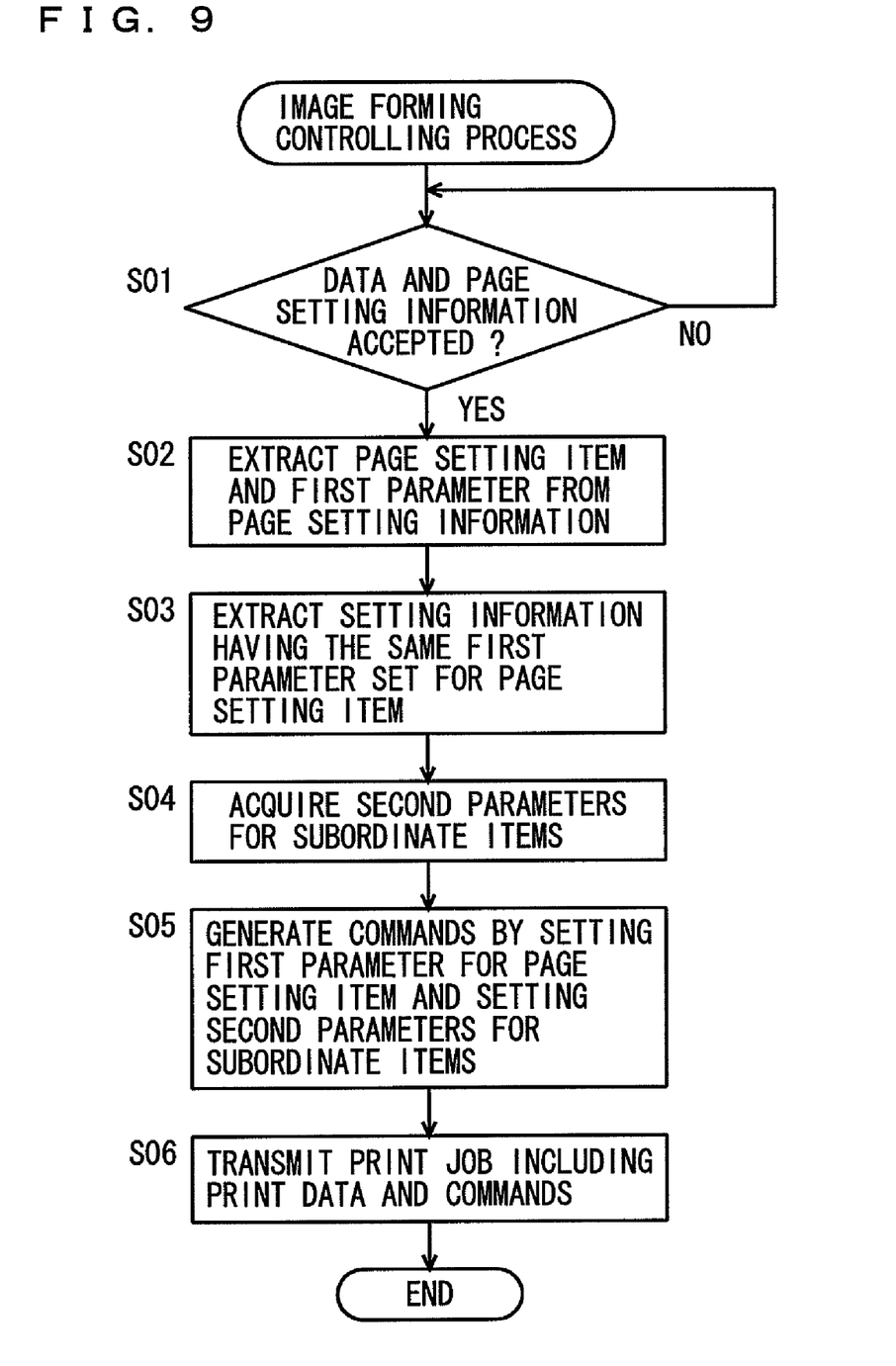
FIG. 9 is a flowchart illustrating an example of the flow of a printer controlling process.

FIG. 9 is a flowchart illustrating an example of the flow of an image forming controlling process. The image forming controlling process is carried out by CPU 101 included in PC 100 as CPU 101 executes an image forming controlling program.

Referring to FIG. 9, CPU 101 determines whether data to be printed and page setting information have been accepted (step S01). Specifically, it is determined whether CPU 101 has executed an application program and accepted the data and the page setting information from the process. CPU 101 is in a standby mode until the data and the page setting information are accepted (NO in step S01), and once the data and the page setting information are accepted (YES in step 501), the process proceeds to step S02.

In step S02, a page setting item and a first parameter are extracted from the page setting information. Here, the page setting item is "paper tray", and the first parameter is one of "tray 01", "tray 02", "tray 03", "tray 04", "tray 11", "tray 21", and "tray 31" which are each named so as to identify one of the four paper trays included in paper feeding portion 224 in MFP 200. Here, it is assumed that the page setting information includes "tray 01" as the first parameter.

In the following step S03, the setting information in which the same first parameter as the one extracted in step S02 is set in the field of the page setting item is extracted from setting information 71 stored in HDD 107. Specifically, the setting information having "tray 01" set in the field of the page setting item is extracted.

Then, in the following step S04, five second parameters that are set in the respective fields of the subordinate items in the setting information extracted in step S03 are acquired. Specifically, the five second parameters set respectively for the five subordinate items of "print style", "index paper", "stapling", "punching", and "end of stapling" are acquired.

In step 505, a command having the first parameter extracted in step S02 set for the page setting item and five commands having the five second parameters acquired in step S04 set for the five subordinate items, respectively, are generated. Then, a print job, including the print data obtained by converting the data acquired in step S01 and the commands generated in step S05, is transmitted to MFP 200 (step S06), and the process is finished.

In the process in which the application program is executed, the user is only necessary to set the first parameter which can be set for the page setting item of "paper tray", and correspondingly, the second parameters which can be set for the subordinate items, other than the page setting item, which can be set in MFP 200 are set automatically. Thus, even in the case where a page is added to or deleted from the data that is processed by the process in which the application program is executed, the correspondence between the pages and the first parameters set in the page setting items for the corresponding pages before addition or deletion of a page can be maintained after the addition or deletion of the page, and thus, the correspondence between the pages and the second parameters set in the subordinate items for the corresponding pages before addition or deletion of a page can also be maintained after the addition or deletion of the page. This ensures that, in the data that is processed by the process in which the application program is executed, the printing conditions set for the respective pages remain unchanged before and after addition or deletion of a page.

Figure 10:
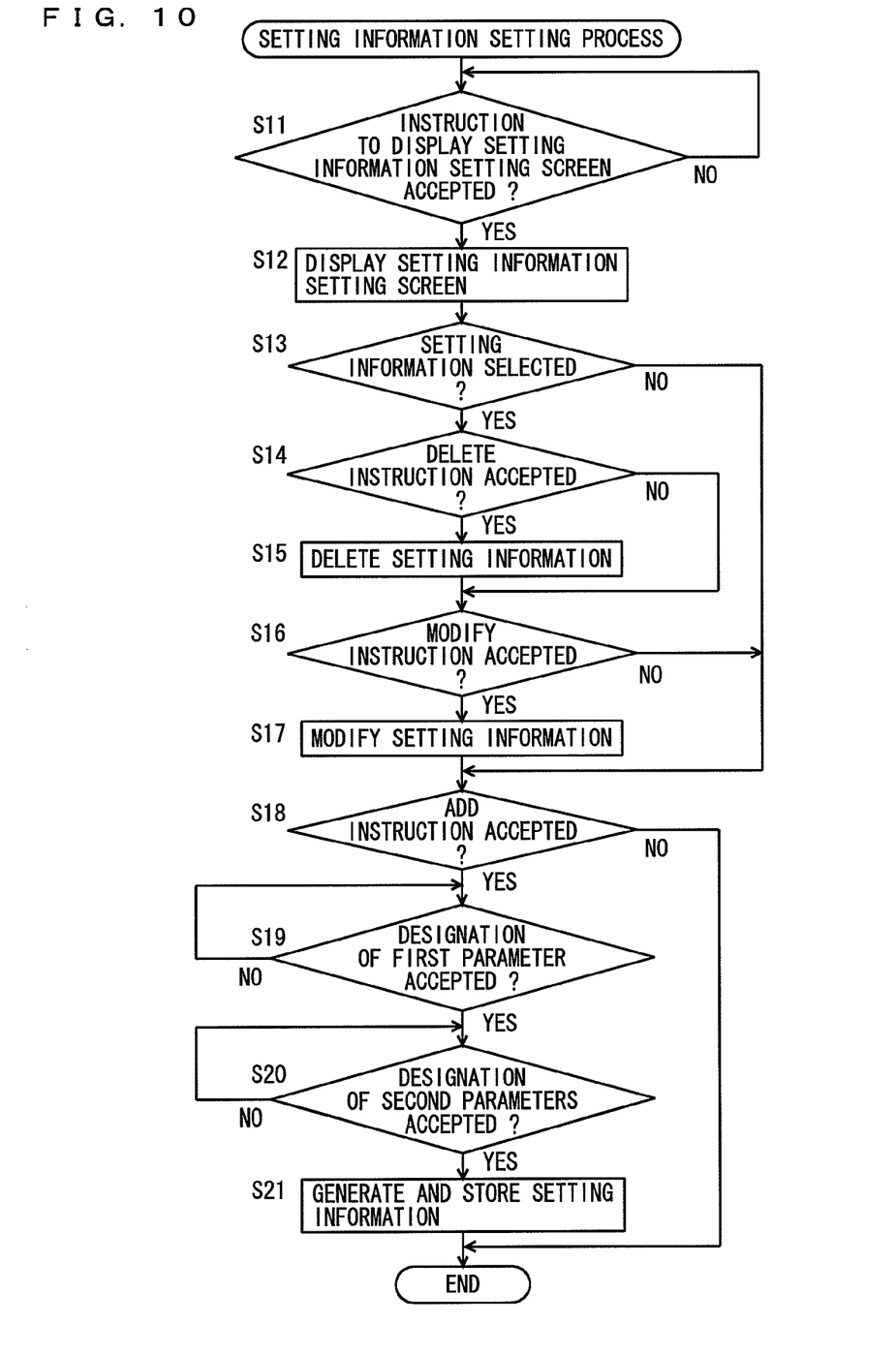
FIG. 10 is a flowchart illustrating an example of the flow of a setting information setting process.

FIG. 10 is a flowchart illustrating an example of the flow of a setting information setting process. The setting information setting process is carried out by CPU 101 included in PC 100 as CPU 101 executes the image forming controlling program. Referring to FIG. 10, CPU 101 determines whether an instruction to display a setting information setting screen has been accepted (step S11). CPU 101 is in a standby mode until a user inputs to input portion 119A an instruction to display the setting information setting screen (NO in step S11), and once the user inputs the instruction (YES in step S11), the process proceeds to step S12.

In step S12, setting information setting screen 301 is displayed on display portion 119B, and the process proceeds to step S13. In step S13, it is determined whether one of the setting information displayed has been selected. If the setting information has been selected, the process proceeds to step S14; otherwise, the process proceeds to step S18.

In step S14, it is determined whether a delete instruction has been accepted. When the user operates input portion 119A to designate button 313 on setting information setting screen 301, the delete instruction is accepted. If the delete instruction has been accepted, the process proceeds to step S15; otherwise, the process proceeds to step S16, with step S15 being skipped.

In step S15, the setting information selected in step S13 is deleted. Specifically, the setting information selected in step S13 is erased from setting information 71 stored in HDD 107.

In step S16, it is determined whether a modify instruction has been accepted. When the user operates input portion 119A to select a subordinate item in area 305 on setting information setting screen 301 and set another second parameter in area 307, then the modify instruction is accepted. If the modify instruction has been accepted, the process proceeds to step S17; otherwise, the process proceeds to step S18, with step S17 being skipped.

In step S17, the setting information selected in step S13 is modified using the second parameter accepted in step S16. Specifically, the second parameter included in the setting information selected in step S13 from among setting information 71 stored in HDD 107 is overwritten.

In step S18, it is determined whether an add instruction has been accepted. When the user operates input portion 119A to designate button 311 on setting information setting screen 301, the add instruction is accepted. If the add instruction has been accepted, the process proceeds to step S19; otherwise, the process is terminated.

In step S19, CPU 101 is in a standby mode until designation of a new first parameter to be set for the page setting item is accepted, and once the designation of the first parameter is accepted, the process proceeds to step S20. Specifically, in area 303 on setting information setting screen 301, designation of a new first parameter, different from any of "tray 01", "tray 02", "tray 03", "tray 04", "tray 11", "tray 21", and "tray 31" that have already been set, is accepted. It is noted that the new first parameter should be the information that specifies any of the four paper trays included in paper feeding portion 224 in MFP 200.

In step S20, CPU 101 is in a standby mode until designation of five second parameters to be set respectively for the five subordinate items is accepted, and once the designation of the five second parameters is accepted, the process proceeds to step S21. Specifically, when the subordinate item is selected in area 305 and the second parameter is set in area 307 on setting information setting screen 301, designation of the second parameter is accepted.

In step S21, setting information including the first parameter designated in step S19 and the five second parameters designated in step S20 is newly generated, and added to setting information 71 stored in HDD 107. Specifically, the setting information is generated by setting the first parameter in the field of the page setting item and setting the five second parameters in the respective fields of the corresponding subordinate items.

Figure 11:
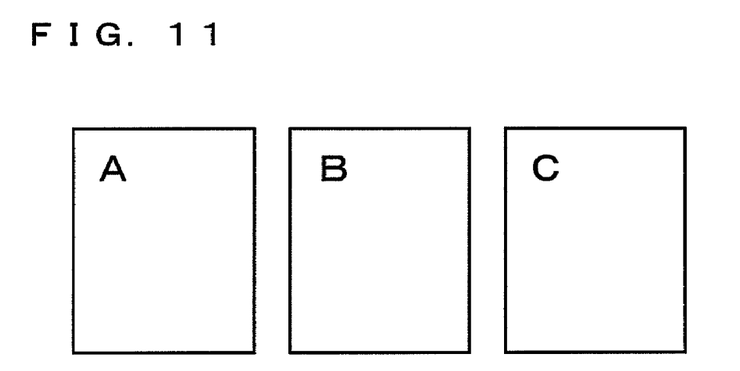
FIG. 11 is a first diagram showing an example of printed data.

FIG. 11 shows an example of printed data. Shown in FIG. 11 is a result of printing data consisting of three pages, with the first parameter "tray 01" set for the page setting item "paper tray" for each of the pages. The first parameter "tray 01" indicates the paper tray named "tray 01" among the four paper trays included in MFP 200, which stores plane paper of "A4" size. Thus, the first through third pages are printed on the sheets of "A4" size plane paper. In FIG. 11, for the sake of explanation, the first, second, and third pages are shown as images including the characters "A", "B", and "C", respectively.

Figure 12:
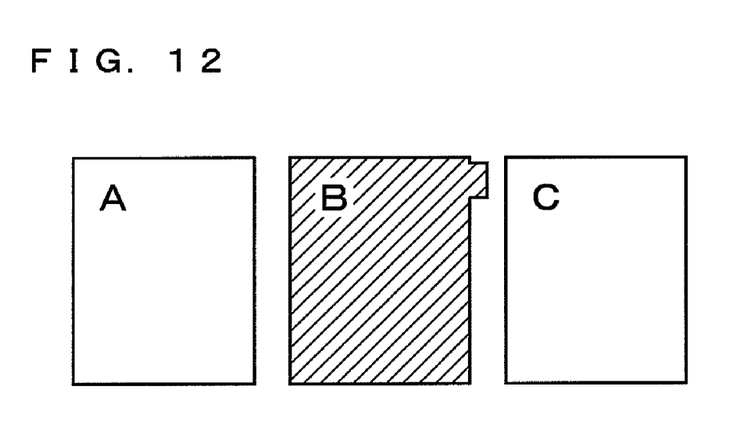
FIG. 12 is a second diagram showing another example of printed data.

FIG. 12 shows another example of printed data. In this example, the page settings for the data have been changed for only the second page from those in the example shown in FIG. 11. Specifically, the first parameter "tray 01" that had been set for the page setting item "paper tray" for the second page has been changed to "tray 02". The first parameter "tray 02" indicates the paper tray named "tray 02" among the four paper trays included in MFP 200, which stores index paper of "A4" size. Thus, while the first and third pages are printed on the sheets of "A4" size plane paper, the image of the second page is printed on a sheet of "A4" size index paper.

Figure 13:
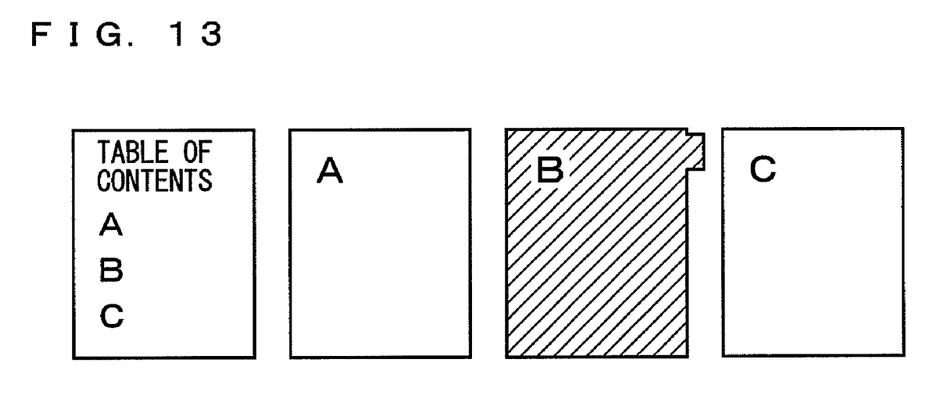
FIG. 13 is a third diagram showing yet another example of printed data.

FIG. 13 shows yet another example of printed data. In this example, a page showing a table of contents has been added before the first page in the same data as in the example shown in FIG. 12, and the first parameter "tray 01" has been set for the page setting item "paper tray" for that page of the table of contents. Pages one to three before insertion of the page of the table of contents are renumbered as pages two to four, respectively, while the page settings remain associated with the originally assigned pages. As a result, the second and fourth pages each have the first parameter "tray 01" set in the page setting item "paper tray", and the third page has the first parameter "tray 02" set in the page setting item "paper tray". For the page of the table of contents added as the first page, the first parameter "tray 01" is set in the page setting item "paper tray", and accordingly, the first, second, and fourth pages are printed on the sheets of "A4" size plane paper, while the third page is printed on the sheet of "A4" size index paper.

As described above, according to PC 100 of the present embodiment, HDD 107 stores the setting information in which a first parameter which can be set for the page setting item is associated with at least one second parameter which can be set respectively for at least one subordinate item selected from among a plurality of option items which can be set for printing in an image forming apparatus. In the case where print instruction accepting portion 55 accepts from application executing portion 63 the data including a plurality of pages and the page setting information including a page setting item which can be set on a page basis and having a parameter set for the page setting item for each of the plurality of pages (S01), extracting portion 57 extracts, from among a plurality of pieces of setting information 71 stored in HDD 107, the setting information which includes the same first parameter as the one set for the page setting item in the page setting information (S03), and command generating portion 59 generates, for each of the plurality of pages, a command to cause MFP 200 or MFP 201 to perform printing, on the basis of the first parameter and the at least one second parameter associated with that first parameter by the setting information (S05).

Therefore, the user is only necessary to set the first parameter for the page setting item, and correspondingly, the second parameters are set for the subordinate items, other than the page setting item, which can be set in MFP 200 or MFP 201. This facilitates setting on a page basis. Further, even in the case where a page is added to or deleted from the data in the application program, the first parameters which have been set for the page setting items in the respective pages before addition or deletion of a page remain associated with the pages before the addition or deletion of the page, and the second parameters set for the subordinate items also remain associated with the pages before the addition or deletion of the page. This ensures that the contents set for the respective pages remain unchanged before and after addition or deletion of a page.

Further, printer information providing portion 61 acquires the names identifying the four paper trays for use in storing sheets of paper which are included in paper feeding portion 224 in MFP 200, and the first parameters to be set in the field of the page setting item in the setting information are each named so as to identify one of the four paper trays included in paper feeding portion 224 in MFP 200, and there may be one or more first parameters corresponding to a respective one of the four paper trays. Thus, setting information 71 of the same number as the number of the first parameters each named to identify one of the four paper trays included in paper feeding portion 224 can be stored. For example, for the paper tray named "tray 01", four pieces of setting information including the first parameters of "tray 01", "tray 11", "tray 21", and "tray 31", respectively, may be stored.

Furthermore, setting portion 53 modifies or deletes any of setting information 71 stored in HDD 107 or adds new setting information thereto. Therefore, the settings for the respective pages can be predetermined in accordance with the use by a user.

While PC 100 has been described in the above embodiment, the present invention may of course be understood as an image forming controlling method for causing PC 100 to execute the process shown in FIG. 9 or 10, or an image forming controlling program embodied on a computer readable recording medium for causing PC 100 to execute the image forming controlling method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming controlling apparatus for controlling an image forming apparatus, the image forming controlling apparatus comprising:

a print instruction accepting portion to accept data and page setting information, the data including a plurality of pages, the page setting information including a page setting item which can be set on a page basis and having a parameter set for the page setting item for each of said plurality of pages;

a setting information storing portion to store setting information in advance, the setting information associating a first parameter which can be set for said page setting item with at least one second parameter which can be set respectively for at least one subordinate item selected from among a plurality of option items which can be set for printing in said image forming apparatus;

a command generating portion to generate, for each of said plurality of pages, a command to cause said image forming apparatus to perform printing, on the basis of the first parameter set for said page setting item in said accepted page setting information and said at least one second parameter associated with said first parameter by said stored setting information;

an identification information acquiring portion to acquire identification information for identifying a storage portion which is included in said image forming apparatus and stores recording media for use in printing; and an extracting portion to extract, from among a plurality of pieces of said setting information, the setting information including the same first parameter as said first parameter set for said page setting item in said accepted page setting information; wherein said first parameter defined for said page setting item in said setting information specifies said identification information, and said setting information storing portion stores said plurality of pieces of setting information having corresponding ones of said first parameters for specifying said storage portion, said first parameters being different from each other.

2. The image forming controlling apparatus according to claim 1, wherein each of said at least one subordinate item is an option item that can be set on a page basis among said plurality of option items.

3. The image forming controlling apparatus according to claim 1, further comprising a setting portion to modify or delete said setting information stored in said setting information storing portion, or add new setting information to said setting information storing portion.

4. An image forming controlling method for controlling an image forming apparatus, the image forming controlling method comprising the steps of:

accepting data and page setting information, the data including a plurality of pages, the page setting information including a page setting item which can be set on a page basis and having a parameter set for the page setting item for each of said plurality of pages;

storing setting information in advance, the setting information associating a first parameter which can be set for said page setting item with at least one second parameter which can be set respectively for at least one subordinate item selected from among a plurality of option items which can be set for printing in said image forming apparatus;

generating, for each of said plurality of pages, a command to cause said image forming apparatus to perform printing, on the basis of the first parameter set for said page setting item in said accepted page setting information and said at least one second parameter associated with said first parameter by said stored setting information;

acquiring identification information for identifying a storage portion which is included in said image forming apparatus and stores recording media for use in printing; and extracting, from among a plurality of pieces of said setting information, the setting information including the same first parameter as said first parameter set for said page setting item in said accepted page setting information; wherein said first parameter defined for said page setting item in said setting information specifies said identification information, and said step of storing said setting information includes the step of storing said plurality of pieces of setting information having corresponding ones of said first parameters for specifying said storage portion, said first parameters being different from each other.

5. The image forming controlling method according to claim 4, wherein each of said at least one subordinate item is an option item that can be set on a page basis among said plurality of option items.

6. The image forming controlling method according to claim 4, wherein said step of storing said setting information includes the steps of modifying or deleting said setting information stored, and adding new setting information.

7. An image forming controlling program embodied on a non-transitory computer readable recording medium and executed by a computer controlling an image forming apparatus, the image forming controlling program causing said computer to perform the steps of:

accepting data and page setting information, the data including a plurality of pages, the page setting information including a page setting item which can be set on a page basis and having a parameter set for the page setting item for each of said plurality of pages;

storing setting information in advance, the setting information associating a first parameter which can be set for said page setting item with at least one second parameter which can be set respectively for at least one subordinate item selected from among a plurality of option items which can be set for printing in said image forming apparatus;

generating, for each of said plurality of pages, a command to cause said image forming apparatus to perform printing, on the basis of the first parameter set for said page setting item in said accepted page setting information and said at least one second parameter associated with said first parameter by said stored setting information;

acquiring identification information for identifying a storage portion which is included in said image forming apparatus and stores recording media for use in printing; and extracting, from among a plurality of pieces of said setting information, the setting information including the same first parameter as said first parameter set for said page setting item in said accepted page setting information; wherein said first parameter defined for said page setting item in said setting information specifies said identification information, and said step of storing said setting information includes the step of storing said plurality of pieces of setting information having corresponding ones of said first parameters for specifying said storage portion, said first parameters being different from each other.

8. The image forming controlling program according to claim 7, wherein each of said at least one subordinate item is an option item that can be set on a page basis among said plurality of option items.

9. The image forming controlling program according to claim 7, wherein said step of storing said setting information includes the steps of modifying or deleting said setting information stored, and adding new setting information.

* * * * *